United States Patent [19]

Berezowski et al.

[11] 4,443,693
[45] Apr. 17, 1984

[54] ELECTRO-OPTICAL BADGE READER

[75] Inventors: Jaroslaw Berezowski, Greenwich, Conn.; Harvey M. Feinman, Bronx, N.Y.

[73] Assignee: Sealectro Corporation, Mamaroneck, N.Y.

[21] Appl. No.: 356,046

[22] Filed: Mar. 8, 1982

[51] Int. Cl.³ .............................................. G06K 7/10
[52] U.S. Cl. ................................... 235/458; 235/474; 235/479; 235/483
[58] Field of Search ............... 235/458, 474, 479, 483, 235/493

[56] References Cited

U.S. PATENT DOCUMENTS

| 3,953,712 | 4/1976 | Horvath | 235/493 |
| 3,979,578 | 9/1976 | McCullough et al. | 235/458 |
| 3,993,893 | 11/1976 | Graf | 235/458 |
| 4,114,021 | 9/1978 | Baio et al. | 235/458 |
| 4,130,756 | 12/1978 | Arnot et al. | 235/474 |
| 4,150,784 | 5/1979 | Moorman et al. | 235/479 |
| 4,184,632 | 1/1980 | Moss | 235/458 |

Primary Examiner—A. D. Pellinen
Assistant Examiner—Robert Lev
Attorney, Agent, or Firm—Anthony J. Casella; Gerald E. Hespos

[57] ABSTRACT

An optical punched badge reader is provided for slidably receiving a data badge, and reading data holes punched therein. The badge reader includes a row of pairs of registered data sensing apertures arranged perpendicular to the axis along which the data badge is received. The slidable movement of the badge into the badge reader actuates the slidable movement of an electro-optical strobe pair along a stationary strobe strip. In operation, the row of data sensing apertures reads the row component of each punched hole on the data badge while the electro-optical strobe pair and the stationary strobe strip read the column component.

11 Claims, 4 Drawing Figures

ELECTRO-OPTICAL BADGE READER

BACKGROUND OF THE INVENTION

The subject invention relates to optical punched-badge readers. These devices typically hold fixed instructions or data, and are particularly useful in security systems, hospitals, parking lots, time-clocks and other data collection or process control systems.

U.S. Pat. No. 4,114,028 which issued to Alfred R. Baio et al on May 26, 1977, and which is entitled "OPTICAL PUNCHED CARD READER", is assigned to the assignee of the subject application, and the teaching of that patent is incorporated herein by reference.

Briefly, the optical punched-badge reader of U.S. Pat. No. 4,114,028 transforms punched holes in a badge into electrical impulses. This is accomplished by passing the badge between an array of light sources, typically infrared light emitting diodes (LED's), and a corresponding array of light-sensors, typically photoelectric cells. Light from the light sources is detected by the light sensors at locations on the data badge where a punched hole exits, thereby generating an electrical impulse. These generated signals then are carried by known circuitry to a readout terminal or device.

More specifically, the apparatus of U.S. Pat. No. 4,114,028 includes a slot that is dimensioned to slidably accept a data card. A plurality of registered pairs of data sensing apertures are disposed in a row parallel to the front edge of the apparatus. The registered pairs of data sensing apertures correspond in number and spacing to the rows on the data badge used with the apparatus. The apparatus also includes a registered pair of strobe apertures and a strobe generating slide. The strobe generating slide is generally T-shaped, and includes two arm portions and an elongated rectangular body portion. The body portion of the strobe generating slide includes a plurality of slots disposed along its longitudinal axis. The slots are parallel to one another and perpendicular to the longitudinal axis of the body portion. The number and spacing of the slots on the strobe generating slide correspond to the number and spacing of the columns on the data card. A data card inserted into the apparatus will move the strobe generating slide away from the data sensing apertures. As a result, the slots of the strobe generating slide will pass between the strobe apertures and intermittently block the passage of light from the light source in one strobe aperture to the light sensor in the other strobe aperture. The distance between the strobe generating apertures and the data sensing apertures is such that when a slot of the strobe generating slide is aligned with the strobe generating apertures, a column of the data card simultaneously will be aligned precisely with the data sensing apertures. Thus, as a card is inserted into the apparatus the row component of each data point on the punched data card will be sensed by the light signal from the row of apertures parallel to the front edge of the apparatus, while simultaneously, the column component of each data point will be sensed by the signal created by the strobe generating slide. Springs are attached to the arms of the strobe generating slide to return the strobe generating slide and the data card to their initial position subsequent to complete insertion of the data card in the apparatus.

Although the optical punched card reader described in U.S. Pat. No. 4,114,028 is extremely useful, there have been advances in the art which have enabled a reduction in the space requirements of the card reader, thereby meeting the recent strong demand for miniturized electrical devices. For example, U.S. patent application Ser. No. 305,116 filed Sept. 24, 1981, by the applicants of the subject invention, and assigned to the same assignee, pertains to a "MICRO CARD READER" that embodies some of the recent advances in the art. Specifically, the strobe generating slide has been eliminated in the micro card reader of that application thereby substantially reducing the size of the apparatus. The required strobe effect of the apparatus in that application is provided by having each data point in one row of the data badge punched. Thus, as that row is moved between appropriately placed strobe apertures, a strobe effect is provided which corresponds to the column component of each data point on the data card.

The art has continued to advance, as reflected by this disclosure, to enable small card readers with greater data processing potential and with enhanced security attributes.

Accordingly, it is an object of the subject invention to provide an optical punched-badge reader that will be particularly useful in a variety of security systems, data collection systems or process control systems.

It is a further object of the subject invention to provide an optical punched-badge reader that can accept a variety of standard size badges.

It is still a further object of the subject invention to provide an optical punched-badge reader that minimizes the space requirements for moving parts within the reader, and thereby reduces the overall size of the reader.

It is a further object of the subject invention to provide an optical punched-badge reader that maximizes the space on the badge allotted to data points.

It is still another object of the subject invention to provide an optical punched-badge reader that affords greater security against counterfeit data badges.

SUMMARY OF THE INVENTION

The optical punched-badge reader of the subject invention includes a housing having substantially rectangular first and second plates. The plates are substantially the same size and shape and are adjacent to and in register with one another. A recess extends rearwardly from the front edge of the first plate to define a slot in the housing between the first and second plates. The slot is dimensioned to slidably receive a punched-data badge having a plurality of columns and rows. A substantially trapezoidal cutout is provided along the front edge of the first and second plates to facilitate insertion and removal of the data badge.

A row of apertures, which correspond in number and spacing to the rows on the data badge is disposed in the recess parallel to and in close proximity to the front edge of the first plate. The first plate also includes an elongated cutout channel on each side of the recess therein. Each cutout channel extends parallel to the side edges of the first plate for substantially the entire length of the recess.

The second plate covers the recess in the first plate to define the badge receiving slot. It also includes two elongated cutout channels that are in register with the cutout channels on the first plate, and a row of spaced apertures which are in register with the corresponding apertures of the first plate.

The subject badge reader further includes a strobe strip located in one of the elongated cutout channels in the first and second plates. The strobe strip includes a row of apertures which extends parallel to the side edges of the first and second plates. The apertures correspond in number and spacing to the columns on the data badge. An electro-optical pair comprising a light source and a light sensor straddle the strobe strip, and slide in unison thereon toward and away from the front and rear edges of the first and second plates. The electro-optical strobe pair is fixedly attached to a slide mounted in the recess of the first plate. As a data badge is slidably inserted into the slot in the housing, the slide and the electro-optical strobe pair are slidably moved rearwardly. The cooperation between the badge, the slide, the electro-optical strobe pair and the strobe strip will create intermittent signals as the electro-optical strobe pair passes each aperture in the strobe strip.

Each data sensing aperture in the first plate includes a light source, typically an infra-red light emitting diode (LED). Similarly, each data sensing aperture in the second plate includes a light sensor, typically a photoelectric cell or a phototransistor. Since the data sensing apertures of the second plate are in register with the data sensing apertures of the first plate, pairs of registered data sensing apertures are provided with each pair including an LED and a phototransitor. The LED's and the phototransistors are connected to a readout device for interpreting the data message punched into the data badge.

In operation, as a punched data badge is inserted into the reader, the columns of the badge will pass between the data sensing apertures of the two plates. Where a punched hole exists, a light signal transmitted from the LED will pass through the aperture in which the LED is mounted, through the punched hole in the data badge, through the corresponding aperture in the second plate, and will be received by the phototransistor mounted in the aperture of the second plate. Simultaneously, the card being inserted displaces the slide and the electro-optical strobe pair straddling the strobe slide. The movement of the electro-optical strobe pair along the strobe slide creates a series of intermittent light signals. As a result, the row component of each data point on the punched data badge will be sensed by the light signal from the row of apertures parallel to the front edge of the plates, while simultaneously, the column component of each data point will be sensed by the signal created by the electro-optical strobe pair moving along the strobe strip.

The badge reader of the subject invention also provides a pre-loaded constant force return spring which assures smooth operation of the slide and a positive return to the starting position after complete insertion of the card.

Preferably, the slide houses a second electro-optical pair which straddles the strobe strip, but generates no signal until the badge has been fully inserted in the reader. Upon full insertion of the badge into the reader, a separate aperture or hole on the strobe strip is sensed, and a signal is generated. The badge reader also provides a solenoid mounted on the reader. The solenoid provides a plunger which is spring loaded into the reader body, and traps and holds the badge after it has been fully inserted and read. Preferably, the solenoid will grasp the badge through an orientation hole in the badge. Release of the badge is accomplished by means of an external signal, which may be generated either manually or automatically subsequent to reading a proper message on the data badge.

All twelve data sensing apertures in the reader may be used to read the message punched into the data badge. However, in many applications, one pair of data sensing apertures may be utilized to detect the presence of a badge in the reader and another may be used to detect the proper orientation of the badge. The orientation data sensing apertures operate to sense the presence of a non-centrally located orientation hole in the data badge. The electro-optical orientation pair in the reader senses either the round or rectangular orientation holes that are typically used with badges.

All electro-optical devices used with the reader are mounted on printed circuit boards that are readily removable for cleaning and/or replacement. Furthermore, the reader has air passageways molded within its body in a manner which channelizes air flow through the card reader to clean the electro-optical pairs located therein.

DESCRIPTION OF THE PREFERRED EMBODIMENTS

Figure 1:
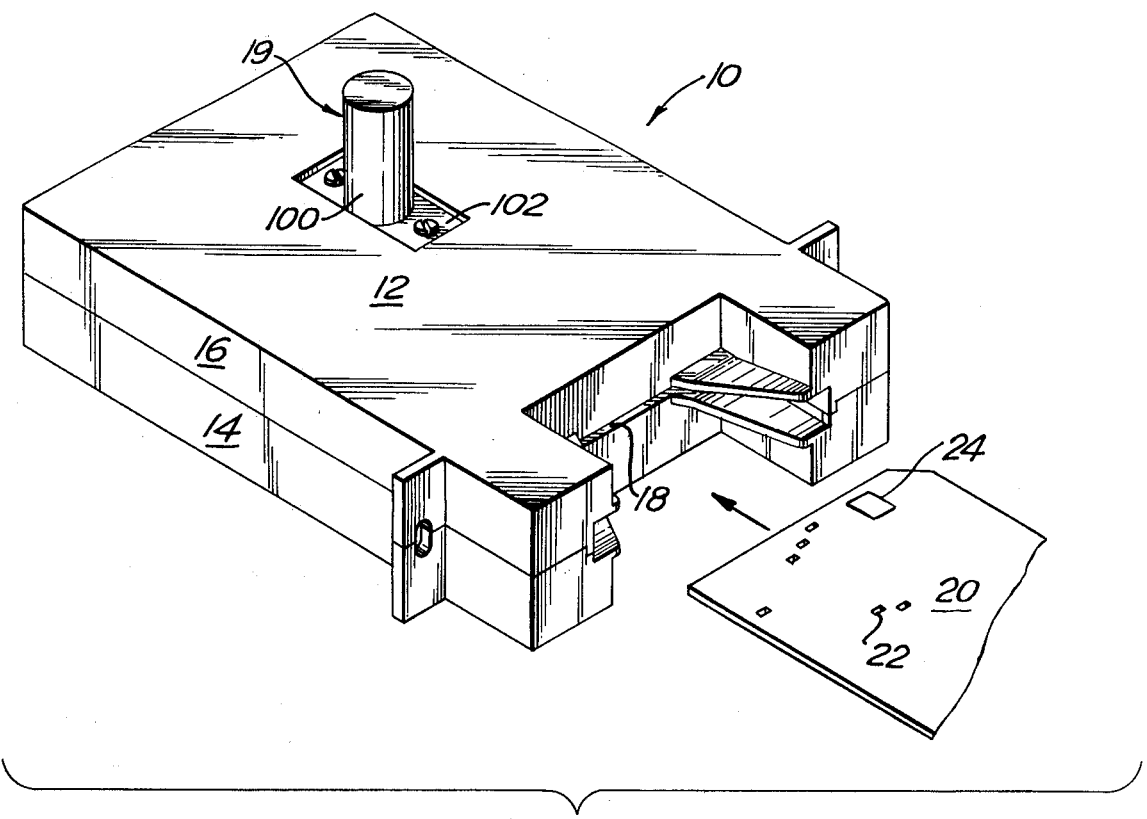
FIG. 1 is a perspective view of the punched-badge reader of the subject invention in its assembled form.

Referring to FIG. 1, the optical punched-badge reader of the subject invention is designated generally by the numeral 10. Specifically, the badge reader 10 includes a top cover 12, a first plate 14 and a second plate 16. Slot 18 in badge reader 10 is dimensioned to slidably receive data badge 20.

Badge 20 is generally rectangular in configuaration and includes a rectangular matrix defining possible locations for data points 22. The matrix includes twelve rows extending parallel to the moving direction of the badge and ten columns extending perpendicular to the rows. Each data point 22 is a narrow rectangular hole with a unique row and column designation. The particular arrangement of data points 22 on badge 20 defines a code that is detected by badge reader 10 as described hereinafter. Badge 20 also includes a generally square orientation hole 24 which is asymmetrically located between the side edges of the data badge. The subject badge reader is adapted to read either square orientation holes, such as shown in FIG. 1, or round orientation holes (not shown) which are provided on many standard badges.

Badge retaining mechanism 19 is a tubular pull solenoid which includes a plunger. Upon complete insertion of badge 20 in badge reader 10, the plunger extends through orientation hole 24 to trap badge 20 in badge reader 10 until an external signal is received, as explained further below.

Figure 2:
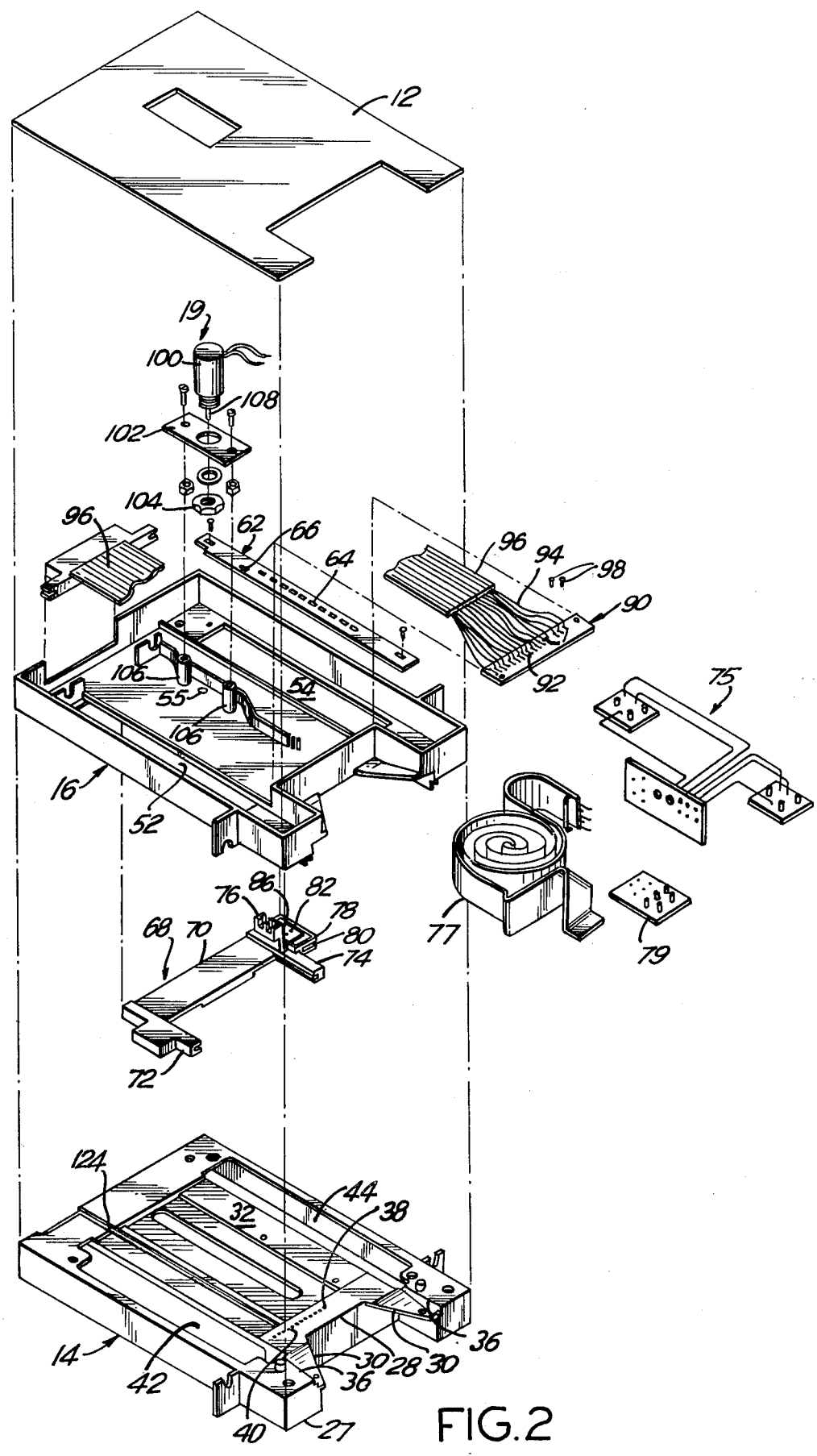
FIG. 2 is an exploded perspective view of the components of the subject punched-badge reader.

FIG. 2 shows an exploded perspective view of the major operative parts of the subject badge reader 10. The first plate 14 of the subject badge reader 10 is generally rectangular in configuration, and the front 27 thereof includes a cutout front portion formed by edges 28 and 30 to facilitate insertion and removal of the badge 20. The first plate 26 includes a recess, indicated generally by number 32, extending rearwardly from edge 28 to rear recess wall 34. In the assembled badge reader 10, recess 32 defines slot 18 for slidably receiving badge 20. The width of recess 32 is defined by side edges 36 extending a short distance rearwardly from the front 27 of badge reader 10. The distance between the side edges 36 of the recess 32 corresponds to the width of the badge 20, so that the badge 20 may be slidably received within recess 32.

Parallel to and rearward of edge 28 of badge reader 10 is a row of eleven data sensing apertures 40 and colinear therewith orientation sensing aperture 38. In the preferred embodiments, these twelve apertures are arranged on 0.087 inch centers to correspond to the spacing of the rows on standard badges.

Elongated cutout channels 42 and 44 extend substantially the entire length of recess 32, parallel to the side edges 46 of first plate 26.

Second plate 16 is of substantially the same size and configuration as first plate 14. Specifically, second plate 16 includes elongated cutout channels 52 and 54 corresponding to elongated cutout channels 42 and 44 of first plate 14. As shown more clearly in FIG. 3, second plate 16 also includes orientation sensing aperture 58 and eleven data sensing apertures 60. In assembled form, orientation sensing aperture 58 on second plate 16 will be in register with orientation sensing aperture 38 on first plate 14. Similarly, each data sensing aperture 60 on second plate 16 will be in register with a corresponding data sensing aperture 40 on first plate 14. In the preferred embodiment, second plate 16 has no recess comparable to recess 32 in first plate 14.

Returning to FIG. 2, strobe strip 62 is attached to first and second plates 14 and 16 at cutout channels 44 and 54. Strobe strip 62 has ten strobe apertures 64 and end of badge aperture 66. The strobe apertures 64 are arrayed linearly on 0.250 inch centers to correspond to the spacing of the columns on the data badge.

Slide 68 includes central portion 70 and side arm portions 72 and 74. Central portion 70 of slide 68 is dimensioned to be slidably accepted in recess 32 between first plate 14 and second plate 16. Side arm portion 72 of slide 68 is slidably engaged in elongated cutout channels 42 and 52 of the first and second plates 14 and 16 respectively. Similarly, side arm portion 74 of slide 68 is slidably engaged in cutout portions 44 and 54 of the first and second plates 14 and 16 respectively.

Figure 3:
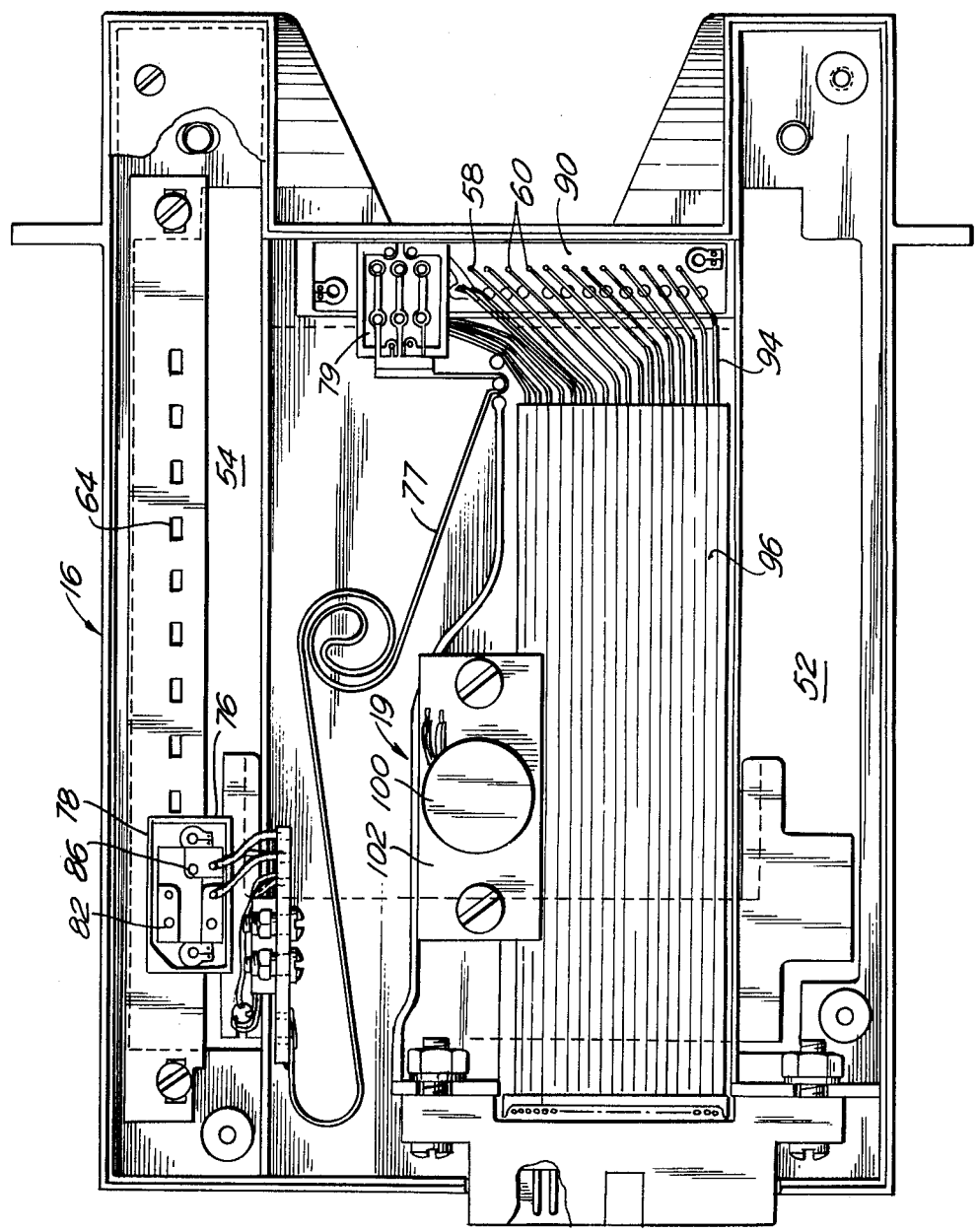
FIG. 3 is a top plan view of the punched-badge reader partially in section.
Figure 4:
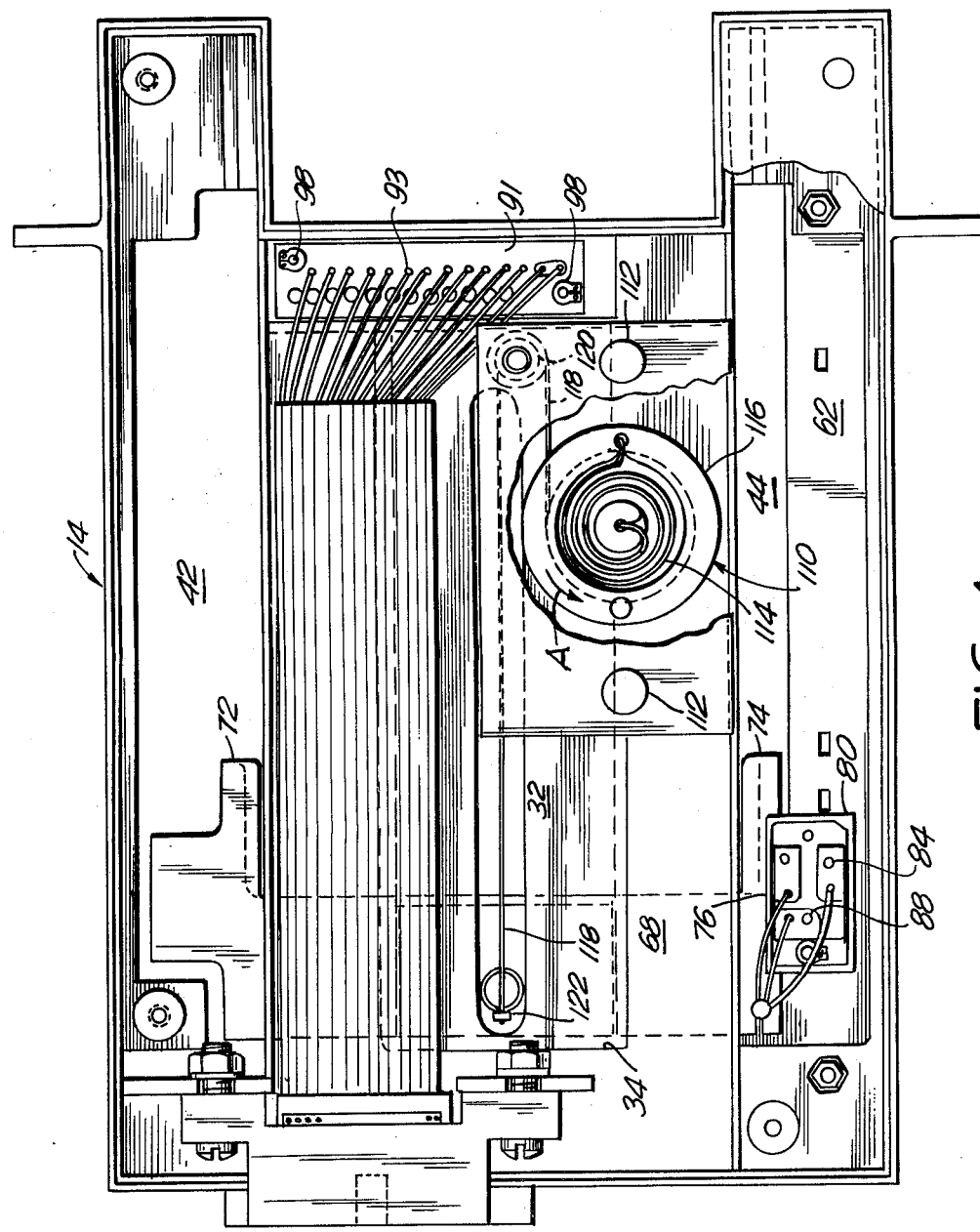
FIG. 4 is a bottom plan view of the punched-badge reader partially in section.

Fixedly attached to side arm portion 74 of slide 68 is electro-optical slide 76. Electro-optical slide 76 includes a top portion 78 and a bottom portion 80. Slide strobe aperture 82 in the top portion 78 of electro-optical slide 76, as shown in FIG. 3, is in register with slide strobe aperture 84 in bottom portion 80 of electro-optical slide 76, as shown in FIG. 4. Similarly, end of badge aperture 86 in top portion 78 of electro-optical slide 76 is in register with end of badge aperture 88 in bottom portion 80 of electro-optical slide 76. In the finally assembled badge reader, electro-optical slide 76 straddles strobe strip 62 such that top portion 78 is on one side of strobe strip 62, and bottom portion 80 is on the opposite side of strobe strip 62. In this assembled form, slide strobe apertures 82 and 84 on electro-optical slide 76 are aligned with strobe apertures 64 on strobe strip 62. Similarly, end of badge apertures 86 and 88 on electro-optical slide 76 are in line with the end of badge aperture 66 on strobe strip 62.

Electro-optical array 90 is a printed circuit board which includes twelve phototransistors 92 which are attached to wires 94 extending to flat cable 96. Electro-optical array 90 is mounted on second plate 16 by removable plastic pins 98 such that the phototransistors 92 extend into orientation aperture 39 and data sensing apertures 41 in second plate 16. Flat cable 96 extends to an appropriate readout device not shown. As shown more clearly in FIG. 4, first plate 14 is attached to electro-optical array 91. However, the electro-optical array 91 attached to first plate 14 includes twelve LED's 93 instead of the twelve phototransistors 92 that are part of electro-optical array 90.

Badge retaining mechanism 19 includes tubular solenoid 100 which is mounted on solenoid plate 102, and attached there by nut 104. Solenoid plate 102 then is mounted on posts 106 on second plate 16 such that plunger 108 in solenoid 100 is aligned with plunger hole 55 in first plate 16.

FIG. 3 is a top view of the subject badge reader showing strobe cable assembly 77 attached to electro-optical slide 76. Strobe cable assembly 77 extends from electro-optical slide 76 to electro-optical array 90 and then to the readout device (not shown) by wires 94 and flat cable 96. The strobe cable assembly 77 is a folded, formed and coiled mylar "flat 7 conductor" cable which unwinds and rewinds with the movement of the electro-optical slide and slide assembly. Cables such as this, with a life in excess of one million operations, are commercially available, and readily are adapted to use in the subject badge reader by attaching appropriate connectors to each end.

FIG. 4 shows the subject badge reader 10 viewed from the bottom with the slide 68 advanced all the way to the rear wall 34 of recess 32 as it would be if badge 20 were fully inserted in badge reader 10. Spring spiral assembly 110 is attached by screws 112 to posts (not shown) in the surface of first plate 14 opposite recess 32. The spring spiral assembly 110 includes a coil spring portion 114 and a reel portion 116. A monofilament line 118, such as a nylon fishing line, is attached to the reel portion 116 of spring spiral assembly 110, and extends therefrom around hub 120 on first plate 14 to line holder 122 on slide 70. Coil 114 is a pre-loaded constant force return spring which exerts a biasing force on reel 116 to rotate reel 116 in the direction shown by arrow A. By this arrangement, spring spiral assembly 110 is biased to wind monofilament line 118 thereon, and thereby to urge slide 70 toward the front 27 of first plate 14.

Returning to FIG. 2, each plate includes an air passage way 124 that extends to the rear of the badge reader 10. Air passageways 124 channelize air flow through badge reader 10 for removing foreign matter therefrom, thus reducing the need for manual cleaning.

In operation, coil 114 of spring spiral assembly 110 exerts a force on reel 116 to keep monofilament line 118 wound thereon, and thereby to keep slide 70 near front 27 of first plate 14. Badge 20 is slidably inserted into the space formed in badge reader 10 by recess 32 in first plate 14. Specifically, badge 20 is slidably moved passed edge 28 of first plate 14. As badge 20 is slidably advanced into recess 32 it moves between the orientation apertures 38 and 39 and the data sensing apertures 40 and 41 on the first and second plates 14 and 16. As mentioned above, orientation aperture 38 and data apertures 40 on first plate 26 each contain an LED. Similarly, orientation aperture 39 and data apertures 41 on second plate 16 each contain a phototransistor. Thus, each pair of registered apertures contains an electro-optical pair for sensing data provided by the data badge.

In the preferred embodiment the photoelectric pair in one pair of registered data apertures 40 and 41 are connected electronically to the readout device (not shown) to detect the presence of the data badge. Thus, as the leading edge of the data badge is moved between this registered pair of data apertures the presence of the card will be transmitted to the readout device.

If the data badge is properly oriented, the orientation hole disposed asymmetrically therein will pass between the registered orientation apertures 38 and 39 on the first and second plates 14 and 16 respectively thereby enabling light to be transmitted from the LED in orientation aperture 38 to the phototransistor in orientation aperture 39. The transmission of light from the electro-optical pair in orientation apertures 38 and 39 will provide a signal to the readout device that the card has been inserted properly, and that the subsequent data thereon can and should be read. Conversely, if the badge 20 is improperly oriented upon insertion into badge reader 10, orientation hole 24 will not be in line with orientation apertures 38 and 39. As a result, light transmitted from the LED in orientation aperture 38 will not be sensed by the phototransistor in orientation aperture 39 in second plate 16. As a result, badge reader 10 will not read any of the data on badge 20.

As badge 20 is slidably advanced in badge reader 10, it will contact slide 70. The force exerted by badge 20 will cause slide 70 to slidably move toward the rear of badge reader 10. As explained above, electro-optical slide 76 straddles strobe strip 62 and is fixedly attached to slide 70. Therefore, the movement of slide 70 caused by the force exerted on badge 20 causes electro-optical slide 76 to move along strobe strip 62. Strobe strip 62 includes ten strobe apertures 64 that are aligned with slide strobe apertures 82 and 84 in electro-optical slide 76. As electro-optical slide 76 is moved along strobe strip 62 light from the LED in strobe aperture 84 will intermittently be able to pass through a strobe aperture 64 in strobe strip 62 to be detected by the phototransistor in slide strobe aperture 82 on the top member 78 of electro-optical slide 76. The strobe aperture 64 in strobe strip 62 that is closest to front edge 28 of first plate 14 is spaced from data apertures 40 and 41 such that when the electro-optical strobe pair on electro-optical slide 76 is aligned with the first strobe aperture 64 in strobe strip 62, the first column of data points 22 on data badge 20 will be aligned precisely with the data sensing apertures 40 and 41. Furthermore, as mentioned above, the distance between the strobe apertures 64 in strobe strip 62 equals the distance between the columns of data points 22 on data badge 20. Thus, each time the electro-optical strobe pair on electro-optical slide 76 is aligned with a strobe aperture 64 on strobe strip 62, a column of data points 22 on data badge 20 will be precisely aligned with data apertures 40 and 41. In this manner, the row component of each data point 22 on the punched data badge 20 will be sensed by the light signals from data sensing apertures 40 and 41 disposed parallel to the front edge 28 of the first and second plates. Simultaneously, the column component of each data point 22 on the punched data badge 20 will be sensed by the signal created by the intermittent passage of light through strobe apertures 64 in strobe strip 62.

When the data badge 20 is completely inserted into badge reader 10, the electro-optical end of badge pair mounted on electro-optical slide 76 will be in line with the end of badge aperture 66 in strobe strip 62. The signal thus received, will trigger the movement of plunger 108 on tubular solenoid 100 to advance through hole 55 in second plate 16 and into orientation hole 24 on data badge 20 thereby trapping data badge 20 in badge reader 10. Plunger 108 will retain data badge 20 in card reader 10 until an external signal is received to retract plunger 108 back into tubular pull solenoid 108.

Upon release of data badge 20 by plunger 108 the force exerted by coil spring 114 in spring spiral assembly 110 will cause reel 116 to rotate in the direction indicated by arrow A. The rotation of reel 116 will cause monofilament line 118 to be rewound onto reel 116. As monofilament line 118 advances around hub 120 onto reel 116 it exerts a force on slide 70 at line holder 122 thereby advancing slide 70 and data badge 20 toward the front of badge reader 10.

In summary, an optical punched-badge reader is provided for reading data on a data badge. The badge reader includes a housing having similarly configured first and second plates adjacent to and in register with one another. A recess in the surface of the first plate adjacent to the second plate defines a slot in the badge reader for slidably receiving the data badge. Twelve pairs of registered data sensing apertures are disposed in a row parallel to the front of edge of the badge reader. The spacing between the pairs of registered data sensing apertures corresponds to the spacing between rows on the data badge. Additionally, each pair of data sensing apertures includes one light source and one light sensor. The slidable movement of the badge into the badge reader actuates the slidable movement of an electro-optical strobe pair along a stationary strobe strip. In operation, the row of data sensing apertures reads the row component of each punched hole on the data badge while the electro-optical strobe pair and the stationary strobe strip read the column component. Upon complete insertion of the data badge into the card reader, the plunger on a tubular pull solenoid traps the data badge in the badge reader and retains it therein until an appropriate external signal is received. By this arrangement, a compact badge reader is provided that has enhanced security control. More specifically, the subject badge reader is compact along the moving axis of badge because it provides a stationary strobe strip. Prior readers, on the other hand, utilized moving strobe strips which either added significantly to the length of the apparatus or which reduced the space allotted to data messages on the badge as described above. The enhanced security of the subject badge reader is provided by the cooperation between the end of badge aperture in the strobe strip, the corresponding electro-optical pair on the slide, the solenoid and the orientation aperture on the badge which can trap the badge in the reader as explained above.

While the preferred embodiment of the subject invention has been described and illustrated, it would be obvious that various changes and modifications can be made therein without departing from the spirit of the invention which should be limited only by the scope of the appended claims.

What is claimed is:

1. An optical badge reading apparatus for use with a data badge having columns and rows of data apertures and an orientation aperture extending therethrough, said apparatus comprising:
   a badge receiving means having a substantially planar slot formed therein and defining an elongated rectangular recess for slidably receiving the data badge, said badge receiving means being provided with a plurality of pairs of registered data sensing apertures extending through said apparatus and across said slot perpendicular to the plane of said slot, said badge receiving means further including an elongated channel on each side of said elongated rectangular recess, each said elongated channel being parallel to the longitudinal axis of said elongated rectangular recess;

a light sensitive sensor mounted within one data sensing aperture of each said pair of registered data sensing apertures, and a light source mounted in the other data sensing aperture of each said pair of registered data sensing apertures;

a strobe strip means having a plurality of strobe generating apertures and an end of badge aperture disposed therein, said strobe strip means being disposed in one of said elongated channels parallel to the longitudinal axis of said badge receiving means, and being fixedly attached to said badge receiving means;

an elongated badge bar extending perpendicular to the longitudinal axis of said elongated rectangular recess, the opposite ends of said elongated badge bar being slidably mounted in said elongated channels such that insertion of the data badge into said elongated rectangular recess causes movement of said elongated badge bar;

an electro-optical strobe means comprising at least one strobe light source and at least one strobe light sensor, said electro-optical strobe means being affixed to said elongated badge bar and disposed in the elongated channel having the strobe bar, such that movement of the elongated badge bar by the data card causes simultaneous movement of said electro-optical strobe means relative to said strobe and end of badge apertures in said strobe strip to create a strobe signal which is detected by said strobe light sensor on said electro-optical strobe means and to detect complete insertion of the badge;

electrical means connecting said electro-optical strobe means, said light sources and said light sensors to a readout device and power source; and a tubular pull solenoid having a plunger means attached thereto, said tubular pull solenoid being activated upon complete insertion of said data badge into said optical badge reading apparatus to extend said plunger means through said orientation hole retaining said data badge in said optical badge reading apparatus, said plunger means being retracted by said tubular pull solenoid upon receipt of a signal from said power source and said readout device.

2. An optical badge reading apparatus as in claim 1 wherein said badge receiving means comprises a substantially rectangular first plate and a second plate having substantially the same configuration as said first plate, said second plate being mounted adjacent to and in register with said first plate, the surface of said first plate adjacent said second plate having an elongated rectangular recess formed therein, said recess defining said slot in said badge receiving means for slidably receiving said data badge.

3. An optical badge reading apparatus as in claim 1 further comprising a biasing means for urging the slidable removal of said data badge from said badge receiving means.

4. An optical badge reading apparatus as in claim 3 wherein said biasing means is in communication with said badge receiving means and said elongated badge bar.

5. An optical badge reading apparatus as in claim 4 wherein said biasing means comprises a reel means mounted on said badge receiving means, a coil spring means cooperating with said reel means to urge the rotation thereof, and a string means having one end mounted on said reel means and the other end mounted on said elongated badge means.

6. An optical badge reading apparatus as in claim 5 wherein said string means is a monofilament nylon line.

7. An optical badge reading apparatus as in claim 2 wherein said plurality of pairs of registered data sensing apertures define a row perpendicular to the longitudinal axis of said elongated rectangular recess.

8. An optical badge reading apparatus as in claim 7 wherein said badge receiving means includes twelve pairs of registered data sensing apertures.

9. An optical badge reading apparatus as in claim 7 wherein one pair of said plurality of pairs of registered data sensing apertures detects the presence of the data badge in said optical badge reading apparatus.

10. An optical badge reading apparatus as in claim 7 wherein said data badge includes an asymmetrically located orientation hole, and wherein one pair of said plurality of pairs of registered data sensing apertures cooperates with said asymmetrically located orientation hole to detect the proper orientation of said data badge.

11. An optical badge reading apparatus as in claim 2 wherein said strobe strip means includes ten strobe generating apertures.

* * * * *